(12) United States Patent
Ashihara et al.

(10) Patent No.: US 9,879,725 B2
(45) Date of Patent: Jan. 30, 2018

(54) SLIDING BEARING

(71) Applicants: TAIHO KOGYO CO., LTD., Toyota-shi, Aichi (JP); TOYOTA JIDOSHA KABUSHIKI KAISHA, Toyota-shi, Aichi (JP)

(72) Inventors: Katsuhiro Ashihara, Toyota (JP); Yuichiro Kajiki, Toyota (JP); Hiroki Takata, Toyota (JP); Akihiro Honda, Susono (JP); Motoichi Murakami, Gotemba (JP)

(73) Assignees: TAIHO KOGYO CO., LTD., Toyota-shi, Aichi (JP); TOYOYTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/786,826

(22) PCT Filed: Apr. 25, 2014

(86) PCT No.: PCT/JP2014/061697
§ 371 (c)(1),
(2) Date: Oct. 23, 2015

(87) PCT Pub. No.: WO2014/175426
PCT Pub. Date: Oct. 30, 2014

(65) Prior Publication Data
US 2016/0102707 A1 Apr. 14, 2016

(30) Foreign Application Priority Data

Apr. 26, 2013 (JP) .................................. 2013-093842
Feb. 21, 2014 (JP) .................................. 2014-032101

(51) Int. Cl.
*F16C 33/10* (2006.01)
*F16C 9/02* (2006.01)
*F16C 17/02* (2006.01)

(52) U.S. Cl.
CPC .............. *F16C 33/107* (2013.01); *F16C 9/02* (2013.01); *F16C 17/022* (2013.01);
(Continued)

(58) Field of Classification Search
CPC ........ F16C 9/02; F16C 17/022; F16C 33/103; F16C 33/107; F16C 33/1065; F16C 2240/30; F16C 2240/42
See application file for complete search history.

(56) References Cited

U.S. PATENT DOCUMENTS 6,082,904 A 7/2000 Ono et al.
6,089,756 A 7/2000 Ono et al.
(Continued)

FOREIGN PATENT DOCUMENTS

EP 2765318 A1 8/2014
JP H05-9461 A 1/1993
(Continued)

OTHER PUBLICATIONS

Extended European Search Report issued in European Application No. 14788022.3 dated Apr. 11, 2016.

*Primary Examiner* — James Pilkington
(74) *Attorney, Agent, or Firm* — Andrews Kurth Kenyon LLP

(57) ABSTRACT

Provided is a slide bearing with which friction can be reduced and the total amount of effluent oil can be reduced. In the slide bearing in which the halved members made by dividing the cylinder in two in the direction parallel to the axial direction are disposed vertically, the narrow grooves are provided at an end of the lower halved member in the (Continued)

circumferential direction from a mating surface on a downstream side of a rotation direction to a predetermined bearing angle and peripheral edge parts are provided outside the narrow grooves in an axial direction.

8 Claims, 8 Drawing Sheets

(52) U.S. Cl.
CPC ........ *F16C 33/103* (2013.01); *F16C 33/1065* (2013.01); *F16C 2240/30* (2013.01); *F16C 2240/42* (2013.01)

(56) References Cited

U.S. PATENT DOCUMENTS

| | | | |
|---|---|---|---|
| 8,979,378 B2 * | 3/2015 | Hikita | F16C 9/02 |
| | | | 384/288 |
| 2002/0061147 A1 | 5/2002 | Ono et al. | |
| 2004/0062458 A1 | 4/2004 | Mian et al. | |
| 2009/0257695 A1 | 10/2009 | Ukai et al. | |
| 2013/0209013 A1 | 8/2013 | Beaurepaire et al. | |
| 2013/0216162 A1 | 8/2013 | Hikita et al. | |

FOREIGN PATENT DOCUMENTS

| | | |
|---|---|---|
| JP | H10-231841 A | 9/1998 |
| JP | H10-259827 A | 9/1998 |
| JP | 2003-532036 A | 10/2003 |
| JP | 2008-115936 A | 5/2008 |
| JP | 2009-186000 A | 8/2009 |
| WO | 2011/098290 A1 | 8/2011 |
| WO | 2012060301 A1 | 5/2012 |
| WO | WO2013/140977 * | 9/2013 |

* cited by examiner

Fig.2
Fig.2(a)
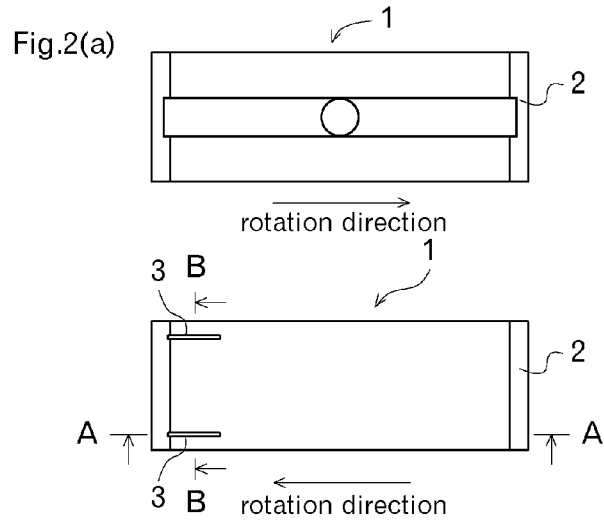
Fig.2(b)
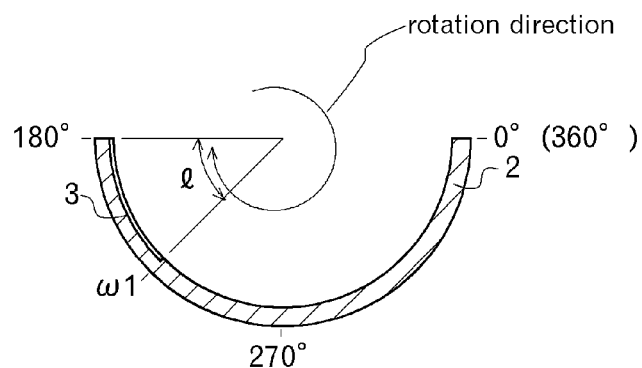
Fig.2(c)
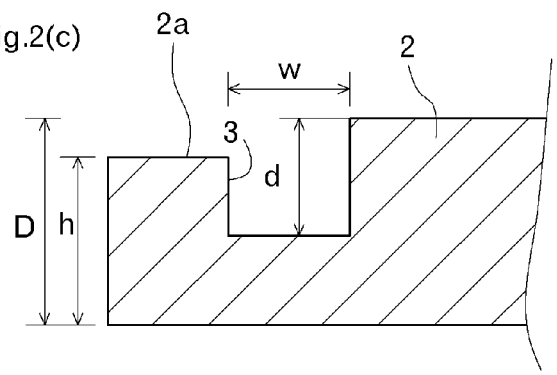

Fig.3
Fig.3(a)
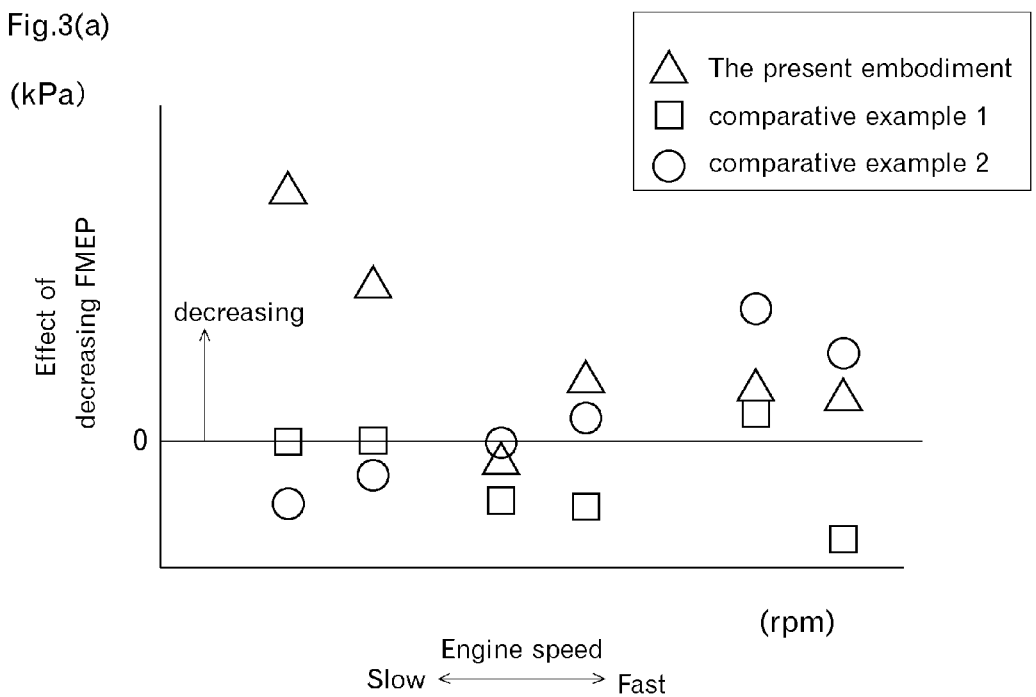
Fig.3(b)
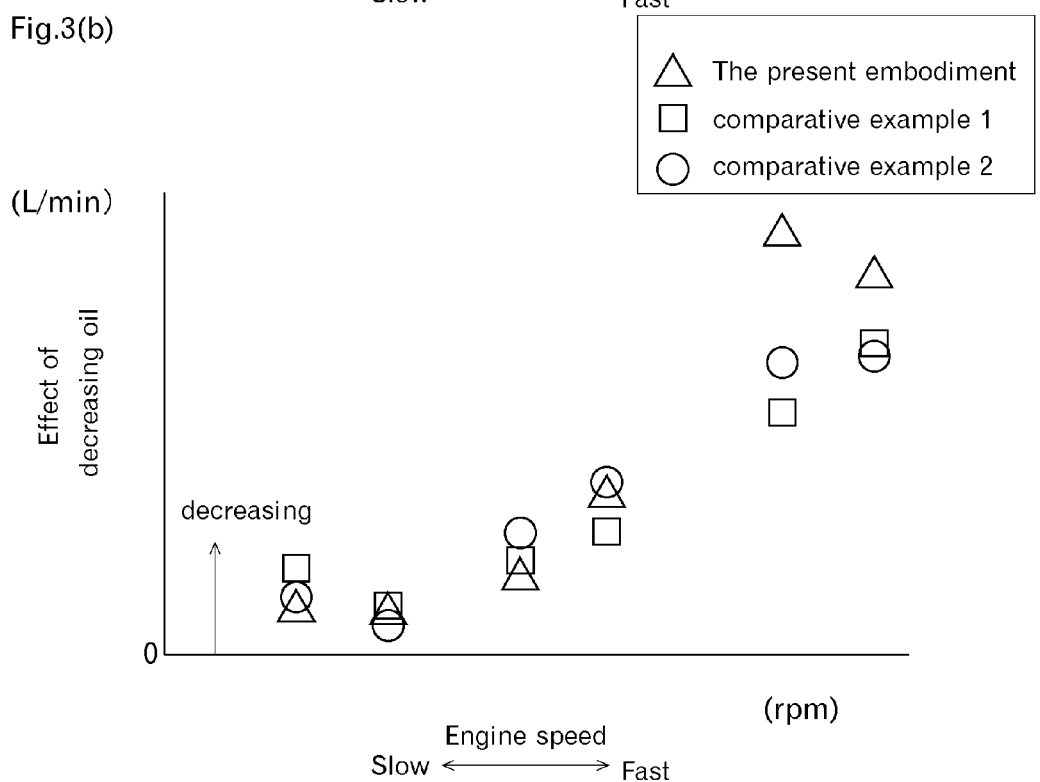

Fig.4
Fig.4(a)
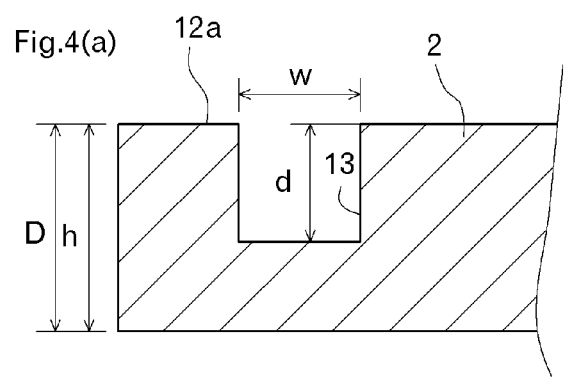
Fig.4(b)
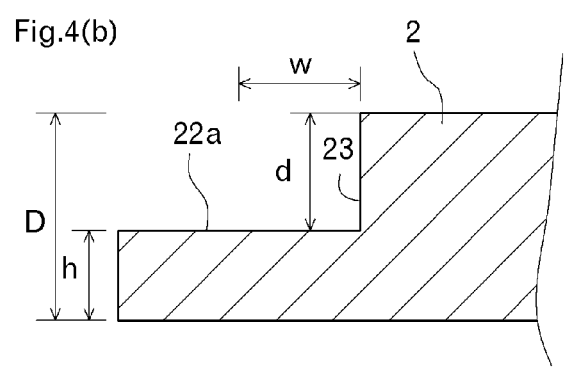

Fig.5
Fig.5(a)
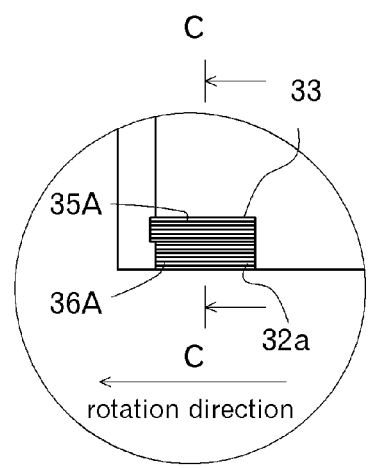
Fig.5(b)
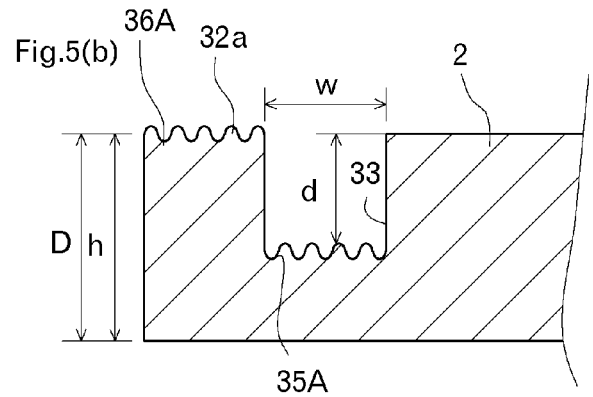

Fig.6
Fig.6(a)
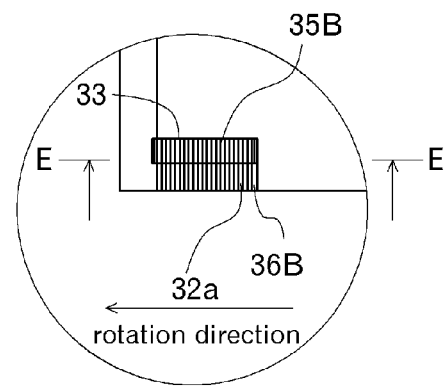
Fig.6(b)
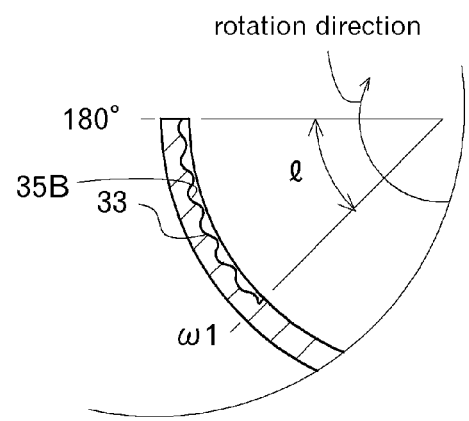

SLIDING BEARING

CROSS-REFERENCE TO RELATED APPLICATIONS

This is a national phase application based on the PCT International Patent Application No. PCT/JP2014/061697 filed Apr. 25, 2014, claiming priority to Japanese Patent Application Nos. 2013-093842 filed Apr. 26, 2013 and 2014-032101 filed Feb. 21, 2014, the entire contents of all of which are incorporated herein by reference.

TECHNICAL FIELD

The present invention relates to a slide bearing. In detail, the present invention relates to a slide bearing having vertically disposed halved members which are made by dividing a cylinder in two in a direction parallel to the axial direction.

BACKGROUND ART

Conventionally, a slide bearing for holding a crankshaft of an engine rotatably that has halved structure in which two members divided in two are mated is known. In order to reduce the frictional area of the bearing and to get friction-reducing effect, the width of the bearing is reduced. However, reducing the width of the bearing causes increase of volume of effluent oil. Then, it is publicly known that relief parts (narrow grooves) all over the circumference are configured at the both ends of the bearing in the axial direction (Patent Literature 1).

PRIOR ART REFERENCE

Patent Literature

Patent Literature 1: the Japanese Translation of PCT International Application Publication No. 2003-532036

DISCLOSURE OF INVENTION

Problems to be Solved by the Invention

However, in the conventional bearing in which narrow grooves all over the circumference are configured, reducing a friction area causes a decrease of the load carrying capacity and the oil film thickness which is necessary for good lubrication is not able to be kept and also the total volume of effluent oil is much.

In consideration of the above problems, the present invention provides a slide bearing for getting friction-reducing effect and to suppress total volume of effluent oil.

Means for Solving the Problems

Problems to be solved by the invention are described as above and the means for solving the problems is explained.

According to an embodiment of the invention, in a slide bearing in which halved members made by dividing a cylinder in two in a direction parallel to the axial direction are disposed vertically, narrow grooves are provided at an end of the lower halved member in the circumferential direction from a mating surface on a downstream side of a rotation direction to a predetermined bearing angle and peripheral edge parts (e.g., border parts) are provided outside the narrow grooves in an axial direction.

According to an embodiment of the invention, the height of the peripheral edge part is lower than the surface of the slide bearing in contact with the crankshaft.

According to an embodiment of the invention, the oil grooves which are narrower than the narrow grooves are disposed at the bottom surface of the narrow grooves and the surface of the peripheral edge parts of the slide bearing to face to the crankshaft.

According to an embodiment of the invention, the oil grooves are configured to the parallel direction to the rotation direction.

According to an embodiment of the invention, the oil grooves are configured to the orthogonal direction to the rotation direction.

According to an embodiment of the invention, the oil grooves are configured to the cross direction to the rotation direction and the oil grooves are slanted by the predetermined angle.

According to an embodiment of the invention, the oil grooves which are narrower than the narrow grooves are disposed at the bottom surface of the narrow grooves and the surface of the slide bearing to face to the crankshaft.

According to an embodiment of the invention, the oil grooves are configured to the parallel direction to the rotation direction.

According to an embodiment of the invention, the oil grooves are configured to the orthogonal direction to the rotation direction.

According to an embodiment of the invention, the oil grooves are configured to the cross direction to the rotation direction and the oil grooves are slanted by the predetermined angle.

Effect of the Invention

As effects of the invention, the effects shown as below are caused.

Namely, by providing the narrow grooves which do not prevent the generation of the oil film pressure, the friction-reducing effect is obtained with reducing the frictional area and the total volume of effluent oil is reduced.

BRIEF DESCRIPTION OF DRAWINGS

FIG. 2(a) is a plan view of a halved member of the slide bearing according to this embodiment, FIG. 2(b) is a A-A line sectional view; and FIG. 2(c) is a B-B line sectional view.

FIG. 3(a) is a graph which shows relation between the engine speed and the effect of decreasing FMEP (as experimental value) and FIG. 3(b) is a graph which shows relation between the engine speed and the effect of decreasing oil per minute (as experimental value).

FIG. 4(a) is a reference sectional view of a slide bearing according to the first comparative example and FIG. 4(b) is a reference sectional view of a slide bearing according to the second comparative example.

FIG. 5(a) is a partly enlarged plan view of a halved member of the slide bearing according to another embodiment and FIG. 5(b) is a C-C line sectional view.

FIG. 6(a) is a partly enlarged plan view of a halved member of the slide bearing according to another embodiment and FIG. 6(b) is an E-E line sectional view.

DETAILED DESCRIPTION OF THE INVENTION

Figure 1:
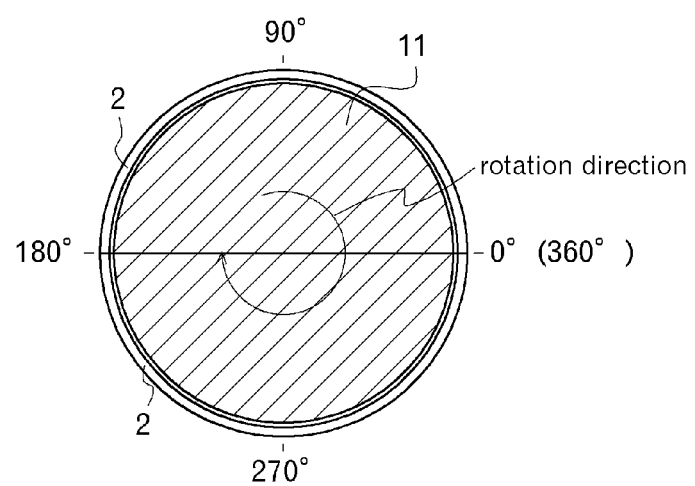
FIG. 1 is a front view of a slide bearing according to this embodiment.

An embodiment of the invention is explained. The FIG. 1 is the front view of the slide bearing 1 and the up and down direction on the drawing is defined as the up and down direction and the near and far direction on the drawing is defined as the axial direction (the front and back direction).

Firstly, the halved members 2 which configure the slide bearing 1 concerning the first embodiment are explained with the FIG. 1 and the FIG. 2.

The slide bearing 1 is cylindrical member and it is adopted to the slide bearing structure of the crankshaft 11 of the engine as shown in the FIG. 1. The slide bearing 1 is configured by the two halved members 2, 2. The halved members 2, 2 have the shapes in which the cylinder has been divided in two in the direction parallel to the axial direction and are shaped as semicircle shape on the cross-section view. In the embodiment, the halved members 2, 2 are disposed in the top and the bottom and the mating surfaces are shaped at the right and the left. In the case that the crankshaft 11 is held by the slide bearing 1, the clearance gap is configured and lubricating oil is supplied from oil route which is not shown toward the clearance gap.

In the FIG. 2(*a*), upper and lower halved members 2 are shown. In the embodiment, the rotation direction of the crankshaft 11 is clockwise direction on the front view as the vector shown in the FIG. 1. In the bearing angle c), the right edge in the FIG. 2(*b*) is defined as 0 degree and the counter clockwise direction shown in the FIG. 2(*b*) is positive direction. Thus, in the FIG. 2(*b*), the bearing angle ω at the left edge is defined as 180 degrees and the bearing angle ω at the down edge is defined as 270 degrees.

A groove is provided in the circumferential direction at the inner circumference of the upper halved member 2 and the circle hole is provided at the center. The mating surfaces are disposed at the right and left side of the upper halved member 2.

In the slide surface of the inner circumference of the lower halved member 2, narrow grooves 3 are configured at the edge in the axial direction.

The narrow grooves 3 are provided at the lower halved member 2. In the embodiment, the narrow grooves 3 are provided as two lines parallel to the axial direction. In detail, the narrow groove 3 is provided from the mating surface on the downstream side of the rotation direction (the bearing angle ω is 180 degrees) toward the direction in which the bearing angle ω is positive number (the counter clockwise direction) on the circumferential direction. Thus, in the lower halved member 2, the mating surface on the right side in the FIG. 2(*b*) is the mating surface on the upstream side of the rotation direction and the mating surface on the left side in the FIG. 2(*b*) is the mating surface on the downstream side in the rotation direction.

As shown in the FIG. 2(*c*), the width of the narrow groove 3 is configured as w.

The depth d of the narrow groove 3 is shorter than the height D from the outer surface of the halved member 2 to the surface in contact with the crankshaft 11.

In the peripheral edge part 2*a* which configures the outside surface of the narrow groove 3 in the axial direction is configured that the height h from the outside surface of the halved member 2 is lower than the height D from the outer surface of the halved member 2 to the surface in contact with the crankshaft 11. Thus, the peripheral edge part 2*a* outside in the axial direction is configured to be further lower than the surround surface in contact with the crankshaft 11.

As the peripheral edge part 2*a* is configured to be further lower than the surround surface in contact with the crankshaft 11, when the crankshaft 11 is leaned and contacted only to the one edge in the axial direction (one-sided contact is happened), the contact opportunity of contact between the peripheral edge part 2*a* and the crankshaft 11 is reduced and the damage of the peripheral edge part 2*a* is able to be prevented.

As the peripheral edge part 2*a* is configured to be further lower than the surround surface in contact with the crankshaft 11, the space at the edge in the axial direction is spread and the retraction oil is increased and the total volume of effluent oil is reduced.

The FIG. 3(*a*) is the graph which shows relation between the engine speed and the effect of decreasing FMEP. The decreasing amount of the friction mean effective pressure (FMEP) in case that the narrow grooves 3 according to this embodiment are provided is shown by the triangle (Δ). The decreasing amount of the friction mean effective pressure (FMEP) in case that the narrow grooves 13 which are shown in the FIG. 4(*a*) as the comparative example are provided is shown by the square (□). The peripheral edge part 12*a* which configures the outside of the narrow groove 13 in the axial direction is configured that the height h from the outside surface of the halved member 2 is equal to the height D from the outer surface of the halved member 2 to the surface in contact with the crankshaft 11. The decreasing amount of the friction mean effective pressure (FMEP) in case that the narrow grooves 23 which are shown in the FIG. 4(*b*) as the comparative example are provided is shown by the circle (○). The peripheral edge part 22*a* which configures the outside of the narrow groove 23 in the axial direction is configured that the height h from the outside surface of the halved member 2 is equal to the height D from the outer surface of the halved member 2 to the surface in contact with the crankshaft 11.

By providing the narrow grooves 3 according to this embodiment, as shown in the FIG. 3(*a*), compared with the case with narrow grooves 13 according to the comparative example 1 and the case with narrow grooves 23 according to the comparative example 2, the decreasing amount of FMEP is increased. Especially, at the area in which the engine speed is low, the decreasing amount of FMEP is increased. FMEP is the value for showing the tendency of the friction and the decreasing amount of FMEP is increased and friction is reduced.

The FIG. 3(*b*) is the graph which shows relation between the engine speed and the effect of decreasing oil per minute. The decreasing amount of the oil in case that the narrow grooves 3 according to this embodiment are provided is shown by the triangle (Δ). The decreasing amount of the oil in case that the narrow grooves 13 which are shown in the FIG. 4(*a*) as the comparative example are provided is shown by the square (□). The peripheral edge part 12*a* which configures the outside of the narrow groove 13 in the axial direction is configured that the height h from the outside surface of the halved member 2 is equal to the height D from the outer surface of the halved member 2 to the surface in contact with the crankshaft 11. The decreasing amount of the oil in case that the narrow grooves 23 which are shown in the FIG. 4(*b*) as the comparative example are provided is shown by the circle (○). The peripheral edge part 22*a* which configures the outside of the narrow groove 23 in the axial direction is configured that the height h from the outside surface of the halved member 2 is equal to the height D from the outer surface of the halved member 2 to the surface in contact with the crankshaft 11.

By providing the narrow grooves 3 according to this embodiment, as shown in the FIG. 3(b), compared with the case with narrow grooves 13 according to the comparative example 1 and the case with narrow grooves 23 according to the comparative example 2, the decreasing amount of oil is increased. Especially, at the area in which the engine speed is high, the decreasing amount of oil is increased.

Next, the narrow grooves 33 with oil grooves 35A according to the second embodiment are explained.

The explanation of the structure of the narrow grooves 35 is omitted because the narrow grooves 35 have the similar structure to the narrow grooves 3 according to the first embodiment.

As shown in the FIG. 5(b), the peripheral edge part 32a which configures the outside surface of the narrow groove 33 in the axial direction is configured that the height h from the outside surface of the halved member 2 is equal to the height D from the outer surface of the halved member 2 to the surface in contact with the crankshaft 11.

Thus, in this embodiment, the height h of the peripheral edge part 32a is equal to the height D to the surface in contact with the crankshaft 11. The height h is not limited to this and for example the height of the peripheral edge part may be lower than the height to the surface in contact with the crankshaft.

As shown in the FIG. 5, the oil grooves 35A which are narrower than the narrow grooves 33 are configured at the bottom surface of the narrow grooves 33. The oil grooves 35A are configured to the parallel direction to the rotation direction of the crankshaft 11 and configured at the whole bottom surface of the narrow groove 33.

The oil grooves 36A are also configured at the surface in contact with the crankshaft 11 which is the surface of the peripheral edge part 32a to face to the crankshaft 11. The oil grooves 36A are configured to the parallel direction to the rotation direction of the crankshaft 11 and configured that the length is equal to the length in the longer direction of the narrow grooves 33 at the surface of the peripheral edge part 32a in contact with the crankshaft 11.

By configuring the oil grooves 35A and 36A which are narrower than the narrow grooves 33 at the bottom surface of the narrow grooves 33 and the surface of the peripheral edge part 32a in contact with the crankshaft 11, the flow of the oil is induced to the rotation direction (circumference direction). The oil flows from downstream side in the rotation direction to upstream side in the rotation direction. Therefore, the volume of effluent oil at the downstream side is reduced and the total volume of effluent oil is reduced.

The oil grooves 35A and 36A which are narrow are configured as wave shaped in the cross section view as shown in FIG. 5(b).

Figure 7:
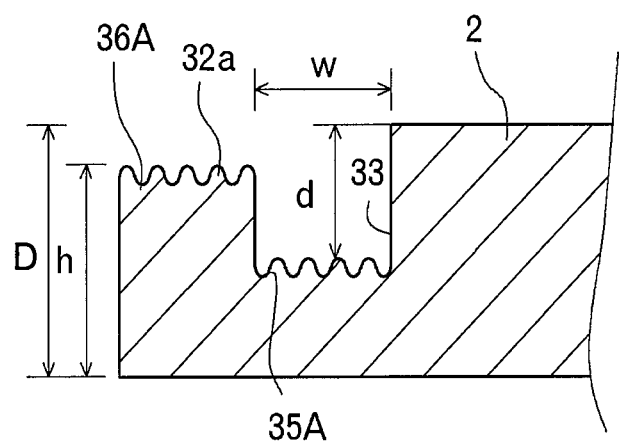
FIG. 7 is a sectional view of the slide bearing according to another embodiment.

As shown in FIG. 7, the peripheral edge part 32a which configures the outside surface of the narrow groove 33 in the axial direction is configured that the height h from the outside surface of the halved member 2 is less than the height D from the outer surface of the halved member 2 to the surface in contact with the crankshaft 11.

Thus, in this embodiment, the height h of the peripheral edge part 32a is less than the height D to the surface in contact with the crankshaft 11.

As shown in the FIG. 5, the oil grooves 35A which are narrower than the narrow grooves 33 are configured at the bottom surface of the narrow grooves 33. The oil grooves 35A are configured to the parallel direction to the rotation direction of the crankshaft 11 and configured at the whole bottom surface of the narrow groove 33.

The oil grooves 36A are also configured at the surface in contact with the crankshaft 11 which is the surface of the peripheral edge part 32a to face to the crankshaft 11. The oil grooves 36A are configured to the parallel direction to the rotation direction of the crankshaft 11 and configured that the length is equal to the length in the longer direction of the narrow grooves 33 at the surface of the peripheral edge part 32a in contact with the crankshaft 11.

By configuring the oil grooves 35A and 36A which are narrower than the narrow grooves 33 at the bottom surface of the narrow grooves 33 and the surface of the peripheral edge part 32a in contact with the crankshaft 11, the flow of the oil is induced to the rotation direction (circumference direction). The oil flows from downstream side in the rotation direction to upstream side in the rotation direction. Therefore, the volume of effluent oil at the downstream side is reduced and the total volume of effluent oil is reduced.

The oil grooves 35A and 36A which are narrow are configured as wave shaped in the cross section view as shown in FIG. 7.

Next, the narrow grooves 33 with oil grooves 35B according to the third embodiment are explained.

As shown in the FIG. 6, the oil grooves 35B which are narrower than the narrow grooves 33 may be configured at the bottom surface of the narrow grooves 33. The oil grooves 35B are configured to the orthogonal direction to the rotation direction of the crankshaft 11 and configured at the whole bottom surface of the narrow groove 33.

The oil grooves 36B are also configured at the surface in contact with the crankshaft 11 which is the surface of the peripheral edge part 32a to face to the crankshaft 11. The oil grooves 36B are configured to the orthogonal direction to the rotation direction of the crankshaft 11 and configured that the length is equal to the length in the shorter direction of the narrow grooves 33 at the surface of the peripheral edge part 32a in contact with the crankshaft 11. The oil grooves 36B are disposed in the longer direction at equal intervals and the oil groove 36B at the most upstream side in the rotation direction is provided at the bearing angle ω which is equal to the angle of the upstream edge of the narrow groove 33.

By configuring the oil grooves 35B and 36B which are narrower than the narrow grooves 33 at the bottom surface of the narrow grooves 33 and the surface of the peripheral edge part 32a in contact with the crankshaft 11, the flow of the oil is induced to the axial direction and the suck back volume of oil at the upstream side is increased and the total volume of effluent oil is reduced.

The oil grooves 35B and 36B which are narrow are configured as wave shaped in the cross section view as shown in FIG. 6(b).

Next, the narrow grooves 33 with oil grooves 35C according to the fourth embodiment are explained.

Figure 8:
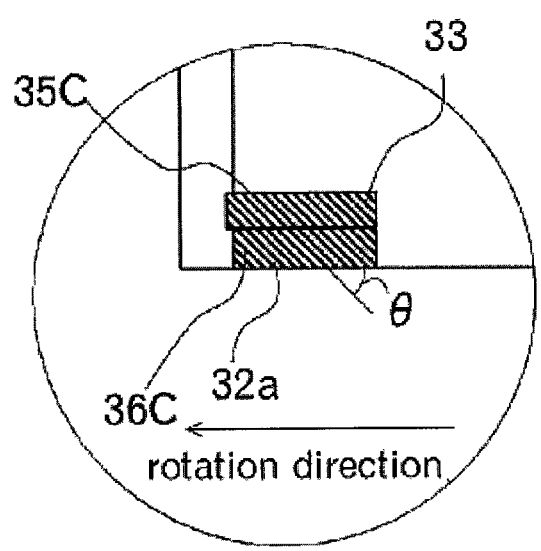
FIG. 8 is a partly enlarged plan view of a halved member of the slide bearing according to another embodiment.

As shown in the FIG. 8, the oil grooves 35C which are narrower than the narrow grooves 33 may be configured at the bottom surface of the narrow grooves 33. The oil grooves 35C are configured to the cross direction to the rotation direction of the crankshaft 11 and the oil grooves 35C are slanted by the predetermined angle θ and configured at the whole bottom surface of the narrow groove 33. Thus the θ is constructed as 0 degree <θ<90 degrees.

The oil grooves 36C are also configured at the surface in contact with the crankshaft 11 which is the surface of the peripheral edge part 32a to face to the crankshaft 11. The oil grooves 36C are configured to the cross direction to the rotation direction of the crankshaft 11 and the oil grooves 36C are slanted by the predetermined angle θ and configured at the surface of the peripheral edge part 32a in contact with the crankshaft 11. The oil grooves 36C are disposed in the longer direction at equal intervals and the oil groove 36C at the most upstream side in the rotation direction is provided at the bearing angle ω which is equal to the angle of the upstream edge of the narrow groove 33.

By configuring the oil grooves 35C and 36C which are narrower than the narrow grooves 33 at the bottom surface of the narrow grooves 33 and the surface of the peripheral edge part 32a in contact with the crankshaft 11 of the slide bearing 1, the flow of the oil is induced toward the oil grooves 35C and 36C. Therefore, the suck back volume of oil at the upstream side is increased and the volume of the effluent oil is decreased and the total volume of effluent oil is reduced.

Thus, the oil grooves 35A, 35B, 35C, 36A, 36B, 36C, are disposed at equal intervals. The intervals is not limited to this, each intervals may be different from each other.

The oil grooves 36A, 36B, 36C, are configured as wave shaped in the cross section view. The shapes are not limited to this, the oil grooves may be configured as square wave shaped and triangle wave shaped in the cross section view.

The angle θ of oil grooves 35C and the angle θ of oil grooves 36C are same. The shapes are not limited to this, the angle θ of oil grooves 35C is bigger than the angle θ of oil grooves 36C.

The height of the peripheral edge part 32a which is provided oil grooves 36A, 36B and 36C is equal to the height D from the outer surface of the halved member 2 to the surface in contact with the crankshaft 11. The height of the peripheral edge part 32a is not limited to this, the height of the peripheral edge part may be lower than the height to the surface in contact with the crankshaft.

As stated above, in the slide bearing 1 in which the halved members 2, 2 made by dividing the cylinder in two in the direction parallel to the axial direction are disposed vertically, the narrow grooves 33 are provided at an end of the lower halved member 2 in the circumferential direction from a mating surface on a downstream side of a rotation direction to a predetermined bearing angle ω1 and peripheral edge parts 32a are provided outside the narrow grooves 33 in an axial direction.

By this structure, the suck back volume of oil is increased and the volume of the effluent oil is decreased and the total volume of effluent oil is reduced.

The oil grooves 35A, 36A which are narrower than the narrow grooves 33 are disposed at the bottom surface of the narrow grooves 33 and the surface of the peripheral edge parts 32a of the slide bearing 1 to face to the crankshaft 11.

By this structure, the oil flows along the oil grooves 35A, 36A. Thus, the suck back volume of oil is increased and the volume of the effluent oil is decreased and the total volume of effluent oil is reduced.

The oil grooves 35A, 36A are configured to the parallel direction to the rotation direction.

By this structure, the flow of the oil is induced to the rotation direction (circumference direction). Thus, the volume of the effluent oil at the downstream side is reduced and the total volume of effluent oil is reduced.

The oil grooves 35B, 36B are configured to the orthogonal direction to the rotation direction.

By this structure, the flow of the oil is induced to the axial direction of the crankshaft 11. Thus, the volume of the effluent oil at the upstream side is increased and the total volume of effluent oil is reduced.

The oil grooves 35C, 36C are configured to the cross direction to the rotation direction and the oil grooves are slanted by the predetermined angle.

By this structure, the flow of the oil is induced toward the oil grooves 35C and 36C. Thus, the suck back volume of oil is increased and the volume of the effluent oil is decreased and the total volume of effluent oil is reduced.

INDUSTRIAL APPLICABILITY

The present invention is acceptable to the skill of the slide bearing and acceptable to the slide bearing having vertically disposed halved members which are made by dividing a cylinder in two in a direction parallel to the axial direction.

DESCRIPTION OF NOTATIONS

1 slide bearing
2 halved member
2a peripheral edge part
3 narrow groove
11 crankshaft

The invention claimed is:

1. A slide bearing for a crankshaft, comprising:
   upper and lower halved members made by dividing a cylinder in two in a direction parallel to an axial direction, said upper halved member disposed vertically above the lower halved member,
   wherein only the lower halved member includes first grooves provided only at one end of the lower halved member, said first grooves extending in a circumferential direction from a mating surface in a direction opposite of a rotation direction of the crankshaft to a predetermined bearing angle,
   wherein border parts are provided outside the first grooves in the axial direction,
   wherein oil grooves which are narrower than the first grooves are disposed at a bottom surface of the first grooves and a surface of the border parts of the slide bearing which faces the crankshaft, and
   wherein only the upper halved member includes a lubrication groove.

2. The slide bearing according to claim 1 wherein the oil grooves are configured in a parallel direction to the rotation direction.

3. The slide bearing according to claim 1 wherein the oil grooves are configured in an orthogonal direction to the rotation direction.

4. The slide bearing according to claim 1 wherein the oil grooves are slanted by a predetermined angle with respect to the rotation direction.

5. A slide bearing for a crankshaft, comprising:
   upper and lower halved members made by dividing a cylinder in two in a direction parallel to an axial direction, said upper halved member disposed vertically above the lower halved member,
   wherein only the lower halved member includes first grooves provided only at one end of the lower halved member, said first grooves extending in a circumferential direction from a mating surface in a direction opposite of a rotation direction of the crankshaft to a predetermined bearing angle,
   wherein border parts are provided outside the first grooves in the axial direction,
   wherein a height of each border part is lower than a surface of the slide bearing in contact with the crankshaft, wherein oil grooves which are narrower than the first grooves are disposed at a bottom surface of the first grooves and a surface of the slide bearing which faces the crankshaft, and wherein only the upper halved member includes a lubrication groove.

6. The slide bearing according to claim 5 wherein the oil grooves are configured in a parallel direction to the rotation direction.

7. The slide bearing according to claim 5 wherein the oil grooves are configured in an orthogonal direction to the rotation direction.

8. The slide bearing according to claim 5 wherein the oil grooves are slanted by a predetermined angle with respect to the rotation direction.

* * * * *